United States Patent [19]

Clark

[11] 4,291,234

[45] Sep. 22, 1981

[54] APPARATUS FOR GENERATING ELECTRICITY

[76] Inventor: Steven J. Clark, Apt. 12, 1544 Meadowlark Dr., Great Falls, Mont. 59404

[21] Appl. No.: 104,004

[22] Filed: Dec. 17, 1979

[51] Int. Cl.³ .............................................. F03B 13/12
[52] U.S. Cl. ...................................... 290/53; 290/42; 417/330; 417/330-333
[58] Field of Search .................................. 290/42, 53

[56] References Cited

U.S. PATENT DOCUMENTS

| 1,439,984 | 12/1922 | Talbert | 417/330 |
| 3,696,251 | 10/1972 | Last et al. | 290/53 |
| 3,961,863 | 6/1976 | Hooper | 290/53 X |

FOREIGN PATENT DOCUMENTS 1024536  3/1966  United Kingdom .................. 290/53

Primary Examiner—J. V. Truhe
Assistant Examiner—W. E. Duncanson, Jr.
Attorney, Agent, or Firm—Arthur L. Urban

[57] ABSTRACT

Apparatus for generating electricity including a chamber with a top opening, anchoring mechanism for positioning the chamber in a body of water with wave movement, mechanism for generating an electrical current disposed within the chamber, and mechanism for transferring the electrical current from the chamber; the chamber including first and second sidewall sections spaced from each other over at least a portion of their surfaces, endwall sections connecting the sidewall sections, the sidewall sections and the endwall sections being connected to each other to form a substantially liquid tight chamber, the anchoring mechanism including mechanism for maintaining the first of the sidewall sections remote from the waves and fixed against movement from the action of the waves, the anchoring mechanism including mechanism for anchoring the second of the sidewall sections in the path of the waves while permitting the second sidewall section to be moved by the action of the waves, the generating mechanism including coil mechanism including an electrically conductive wire, magnet mechanism associated with the coil mechanism and movable with respect thereto, the coil mechanism being affixed to one of the sidewall sections and the magnet mechanism being affixed to the other of the sidewall sections, and the transfer mechanism being connected to the coil mechanism, and biasing mechanism urging the second sidewall section away from the first sidewall section against the action of the waves.

12 Claims, 5 Drawing Figures

U.S. Patent  Sep. 22, 1981  4,291,234
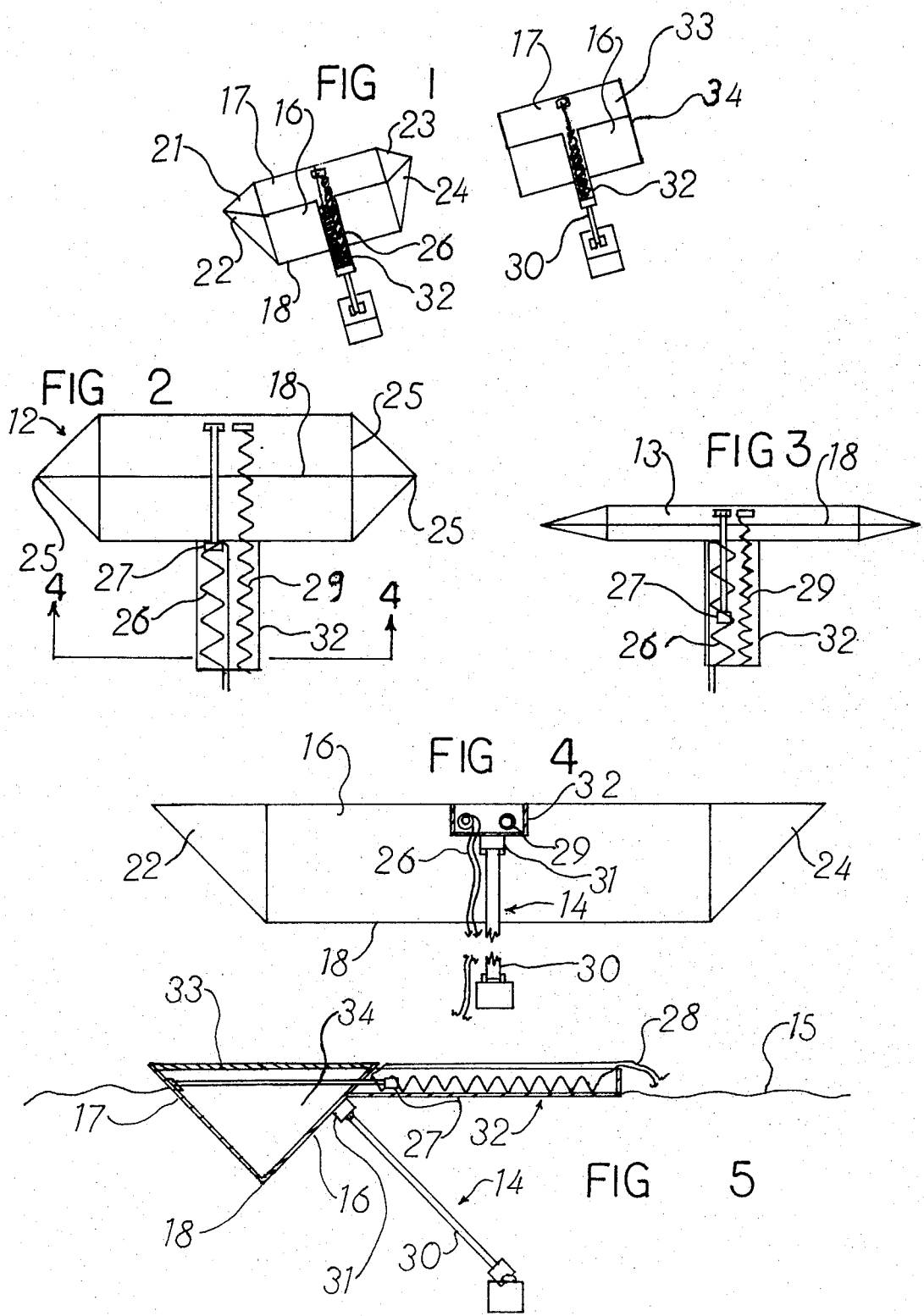

APPARATUS FOR GENERATING ELECTRICITY

This invention relates to a novel apparatus for generating electricity and more particularly relates to a new apparatus utilizing a renewable source of energy for generating electrical power.

With the recent large increases in the cost of fossil fuel energy sources such as petroleum and coal in the United States and other countries, much attention is being directed to alternative energy sources. Energy sources which are renewable rather than depletable in nature are receiving primary consideration. Examples of renewable sources are wind, sun, water power and the like. Such energy sources replenish themselves and thus an unlimited supply is available.

Water power sources generally have relied on the flow of streams, rivers, waterfalls and the like with only a limited interest in the utilization of the energy in waves.

A number of proposals have been made for apparatus that can transform wave power into another form of energy. One design employs three parallel vertical plates linked together and moored to face oncoming waves. The movement of the waves causes one of the plates to move with respect to the others to actuate a water pump. The resulting flow of water is used to drive a water turbine to generate electricity. One of the essential elements of the design is that the plates have to be spaced at critical distances in fractions of the wave length to achieve the desired results. Since waves vary in their length, each apparatus must be specifically designed or altered to meet a particular wave condition.

Another wave power apparatus includes asymmetric cam-shaped mechanisms that oscillate about a fixed point. Also, a floating raft system has been proposed in which energy is extracted through the relative motion of adjacent raft elements. Still another apparatus utilizes sealed air chambers which are acted upon by the waves, to drive an air turbine.

One of the characteristics of the above devices is that they do not convert the wave energy directly into electrical energy. Some of the systems do convert the wave power into electrical energy through conversion first into an intermediate third form of energy. Systems may involve the creation of mechanical or hydraulic elements powered from the wave energy and then the conversion thereof electrical energy, but they do not achieve any direct conversion.

Indirect conversion is not considered desirable because the systems generally are relatively complicated and costly to manufacture. Also, the complexity of the systems increases the chance of operating failure and increases maintenance costs significantly. As a result, the cost of producing a unit of electrical energy may be expensive. In view of deficiencies of previous wave power systems producing electricity from wave power, it is apparent that there still is a need for a wave system that can accomplish this objective more efficiently.

The present invention provides a novel apparatus for generating electricity from wave power. The apparatus of the invention generates electricity directly without transforming the wave power first into an intermediate form of energy. The electrical generating apparatus is capable of operating at a relatively high efficiency as compared with other wave power devices.

The generating apparatus can be used under a variety of wave and water conditions with a minimum of alteration. Also, the apparatus can be adjusted for operation in different tide conditions simply and conveniently.

The generating apparatus of the invention is simple in design and relatively inexpensive to manufacture. The apparatus can be fabricated from commercially available materials using conventional metal fabricating techniques. The apparatus can be fabricated and installed by semi-skilled labor with a minimum of instruction. The apparatus can be made in small or large sizes and can be used in single or multiple unit installations.

Other benefits and advantages of the novel generating apparatus of the present invention will be apparent from the following description and the accompanying drawings in which:

FIG. 1 is a view in perspective illustrating two forms of generating apparatus of the invention positioned in a body of water;

FIG. 2 is a top view of one electrical generating apparatus shown in FIG. 1 in an open position;

FIG. 3 is a top view of the generating apparatus shown in FIG. 2 in a closed position;

FIG. 4 is a side view in section of the generating apparatus taken along line 4—4 of FIG. 2; and FIG. 5 is an end view partially in section of the second electrical generating apparatus, as shown in FIG. 1.

As shown in the drawings, one form of the novel apparatus of the present invention for generating electricity includes a chamber 12 with a top opening 13. The apparatus includes anchoring means 14 for positioning the chamber in a body of water 15 with wave movements. Means are disposed within the chamber 12 for generating an electrical current. In addition, the apparatus includes means for transferring the electrical current from the chamber 12 to an electricity storing or electricity consuming apparatus (not shown).

The chamber 12 includes first and second sidewall sections 16 and 17, respectively. The sidewall sections 16 and 17 are spaced from each other throughout at least a portion of their surfaces with the spaced portions being movable toward each other selectively. The sidewall sections 16 and 17 advantageously are spaced from each other at their upper edges and pivotally connected with a hinge 18 along their lower edges.

Endwall sections connect the side edges of the sidewall sections 16 and 17. The sidewall sections and the endwall sections together form a substantially liquid tight chamber of adjustable size. Advantageously, the endwall sections each include a plurality of end members 21, 22 and 23, 24. The end members 21-24 preferably are pivotally connected to one another to form an edge extending outwardly from the side edges of the sidewall sections 16 and 17. The pivotal connection may be through hinges 25 as shown.

Anchoring means 14 are provided to maintain the chamber 12 in proper position in the water 15. The anchoring means 14 includes means for maintaining the first of the sidewall sections 16 remote from the waves, that is, closest to the shore. The anchoring means 14 fixes the first sidewall section 16 against movement from the action of the waves as they move toward shore.

The anchoring means 14 also includes means for anchoring the second of the sidewall sections 17 in the path of the waves, that is, as the lead surface as the waves move toward shore. The anchoring means 14, however, permits the second sidewall section 17 to be moved toward the first section 16 by the action of the waves.

The anchoring means 14 includes an arm 30 which extends between the bottom of the body of water 15 and the apparatus. Advantageously, the anchoring means also includes means 31 for adjusting the position of the chamber 12 above the bottom of the body of water to maintain the top opening 13 significantly above the surface of the water. Adjustment may be necessary as the level of the water changes such as tidal movement.

The apparatus of the present invention includes means for generating electricity. The generating means includes a coil 26 of electrically conductive wire and a magnet 27 movable with respect thereto. Advantageously, the magnet moves longitudinally of the coil 26, although it may be desirable in some situations to effect other movement of the magnet with respect to the coil 26 such as a rotational movement.

The coil 26 of conductive wire is affixed to one of the sidewall sections, i.e. 16 or 17, with the magnet 27 being affixed to the other of the sidewall sections. Preferably as shown, the coil 26 is affixed to the stationary sidewall section 16.

The apparatus includes current transfer means shown as lead wires 28 connected to the ends of the coil 26. These lead wires carry the electrical current generated by the apparatus to suitable electricity storing or electricity consuming devices such as batteries, motors, heaters and the like.

Biasing means shown as coil spring means 29 urge the movable second sidewall section 17 away from the first sidewall section 16 against the action of the waves. The coil spring means 29 may have the ends thereof connected to the first and second sidewall sections. In certain cases, the coil and magnet combination may of itself create a biasing force to urge the movable sidewall section 17 away from the fixed sidewall section 16 without the necessity for a spring. Also, as shown in FIG. 5, the chamber may have a flexible cover 33 and end walls 34 to retain air therein as a biasing means.

The coil 26 and the biasing means 29 may be housed in a portion 32 extending outwardly from one of the sidewall sections of the chamber. Such a construction allows space for the coil and the spring when the two sidewall sections are positioned closely adjacent to each other.

The novel apparatus of the invention for generating electricity is installed in a body of water with wave movement by attaching the lower end of anchoring arm 30 to the bottom of the body of water. The chamber 12 then is attached to the upper end of the arm 30 preferably through a level adjuster 31. The adjuster 31 maintains the top opening of the chamber 12 a significant distance above the surface of the water. In this way, the chamber 12 is positioned so that a minimum of water is washed into the chamber. The chamber 12 is positioned with one of the sidewall sections 16 or 17 substantially perpendicular to the path of the waves as they move toward the shore. The lead wires 28 are connected to the ends of the wire coil 26 and the apparatus is ready to generate electricity.

As the waves move toward shore, the crest pushes against movable sidewall section 17 moving it toward fixed sidewall section 16 and compressing spring 29. This movement causes magnet 27 attached to the movable sidewall section 17 to advance longitudinally into coil 26. This movement of the magnet through the coil produces a low frequency alternating current in the coil that is transferred away from the generator through lead wires 28. Simultaneously with the movement of section 17, end members 21,22 and end members 23,24 pivot with respect to one another causing the common edge therebetween to move outwardly.

When the crest of the wave is past, the trough of the wave will be at the apparatus. The resulting reduction in the force against the movable sidewall section 17 causes spring 29 to overcome the effect of the water against the sidewall section and return the section to its original open position. This return of the sidewall section causes the magnet 27 to withdraw from the coil 26. The apparatus is now in position to accept the next wave crest and again generate current.

The above description and the accompanying drawings show that the present invention provides a novel apparatus for generating electricity from wave power. The apparatus of the invention provides an efficient means for generating electricity directly without producing an intermediate form of energy.

The generating apparatus of the invention is simple in design and relatively inexpensive to manufacture. The apparatus can be fabricated from commercially available materials using metal working techniques presently employed by industry. The apparatus can be fabricated and installed by semi-skilled labor.

The apparatus of the invention can be made in small or large sizes and can be used in single or multiple unit installations. The generating apparatus is suitable for use in a variety of wave and water conditions with a minimum of modification. Also, the apparatus can be adjusted automatically for operation in different tide conditions if desired.

It will be apparent that various modifications can be made in the particular generating apparatus described in detail above and shown in the drawings within the scope of the invention. For example, the size and configuration of components can be changed provided they do not adversely affect the operation of the apparatus. Also, the apparatus can be constructed of a variety of structural materials to meet specific requirements. As pointed out above, the chamber may include a flexible cover 33 to provide a sealed air chamber which also can function as a biasing means. Furthermore, the endwall sections may be of a different design, e.g., single flexible walls. Therefore, the scope of the invention is to be limited only by the following claims.

What is claimed is:

1. Apparatus for generating electricity including a chamber, anchoring means for positioning said chamber in a body of water with wave movement, means for generating an electrical current disposed within said chamber, and means for transferring said electrical current from said chamber; said chamber including first and second sidewall sections spaced from each other over at least a portion of their surfaces, endwall sections connecting said sidewall sections, said sidewall sections and said endwall sections being connected to each other to form a substantially liquid tight chamber, said anchoring means including means for maintaining the first of said sidewall sections remote from said waves and fixed against movement from the action of said waves, said anchoring means including for anchoring the second of said sidewall sections in the path of said waves while permitting said second sidewall section to be moved by the action of said waves, said generating means including electrically conductive coil means, magnet means associated with said coil means and movable with respect thereto, said coil means being affixed to one of said sidewall sections and said magnet means being affixed to the other of said sidewall sections, said transfer means being connected to said coil means, and biasing means urging said second sidewall section away from said first sidewall section against the action of said waves.

2. Electricity generating apparatus according to claim 1 wherein said first and second sidewall sections are spaced from each other at their upper edges and pivotally connected along their lower edges.

3. Electricity generating apparatus according to claim 1 wherein said endwall sections each include a plurality of members pivotally connected to one another to form an edge extending outwardly from the side edges of said sidewall sections.

4. Electricity generating apparatus according to claim 1 wherein said first sidewall section includes an outwardly extending portion in which said generating means and said biasing means are disposed when said sidewall sections are positioned adjacent to each other.

5. Electricity generating apparatus according to claim 1 wherein said biasing means includes coil spring means, the ends of which are connected to said first and second sidewall sections.

6. Electricity generating apparatus according to claim 1 wherein said anchoring means includes means for adjusting the position of said chamber to maintain a top opening thereof a significant distance above the surface of said water.

7. Electricity generating apparatus according to claim 1 wherein said coil means is connected to said first sidewall section and said magnet means is connected to said second sidewall section.

8. Electricity generating apparatus according to claim 1 wherein said coil means includes an electrically conductive wire.

9. Electricity generating apparatus according to claim 3 wherein said sidewall and endwall sections form a chamber having a generally boat-shaped configuration.

10. Electricity generating apparatus according to claim 5 wherein said generating means and said coil spring means are disposed adjacent to and substantially parallel to each other.

11. Electricity generating apparatus according to claim 1 wherein said biasing means includes a substantially air tight chamber.

12. Electricity generating apparatus according to claim 1 wherein said chamber includes a flexible cover section and flexible endwall sections.

* * * * *